US011092067B2

(12) United States Patent
Larsson, Sr. et al.

(10) Patent No.: US 11,092,067 B2
(45) Date of Patent: Aug. 17, 2021

(54) TURBINE ARRANGEMENT COMPRISING A VOLUTE WITH CONTINUOUSLY DECREASING FLOW AREA HAVING A SUCCESSIVELY REDUCED VALUE

(71) Applicant: SCANIA CV AB, Södertälje (SE)

(72) Inventors: Per-Inge Larsson, Sr., Vagnhärad (SE); Carl Fredriksson, Kinna (SE); Andreas Millbro, Tyresö (SE); ViChi Luu, Järna (SE)

(73) Assignee: Scania CV AB, Södertälje (SE)

( * ) Notice: Subject to any disclaimer, the term of this patent is extended or adjusted under 35 U.S.C. 154(b) by 255 days.

(21) Appl. No.: 16/090,791

(22) PCT Filed: Mar. 14, 2017

(86) PCT No.: PCT/SE2017/050243
§ 371 (c)(1),
(2) Date: Oct. 2, 2018

(87) PCT Pub. No.: WO2017/176186
PCT Pub. Date: Oct. 12, 2017

(65) Prior Publication Data
US 2020/0386148 A1 Dec. 10, 2020

(30) Foreign Application Priority Data
Apr. 8, 2016 (SE) .................................... 1650477-1

(51) Int. Cl.
*F02B 37/02* (2006.01)
*F01D 9/02* (2006.01)
(Continued)

(52) U.S. Cl.
CPC .............. *F02B 37/02* (2013.01); *F01D 9/026* (2013.01); *F01D 17/00* (2013.01); *F01D 25/24* (2013.01); *F02C 6/12* (2013.01); *F05D 2220/40* (2013.01)

(58) Field of Classification Search
CPC .......... F02B 37/02; F01D 9/026; F01D 17/00; F01D 25/24; F02C 6/12; F05D 2220/40
See application file for complete search history.

(56) References Cited

U.S. PATENT DOCUMENTS 4,027,994 A * 6/1977 MacInnes ............... F01D 9/026
415/1
4,512,716 A 4/1985 McHenry et al.
(Continued)

FOREIGN PATENT DOCUMENTS

DE 4331606 C1 10/1994
DE 102007057310 A1 6/2009
(Continued)

OTHER PUBLICATIONS

International Search Report for PCT/SE2017/050243 dated May 18, 2017.
(Continued)

*Primary Examiner* — Jesse S Bogue
(74) *Attorney, Agent, or Firm* — Moore & Van Allen PLLC; W. Kevin Ransom

(57) ABSTRACT

The present invention relates to a turbine arrangement driven by exhaust gases from a combustion engine. The turbine arrangement comprises a turbine housing, a turbine wheel rotatably arranged in the turbine housing, a first volute section defining a curved flow passage extending about 360° around the periphery of the turbine wheel, and an inner radial passage directing exhaust gases radially inwardly from the flow passage into a swept area of the turbine wheel. The curved flow passage has a cross section area decreasing
(Continued)

continuously in the flow direction of the exhaust gases from an initial area at an initial angular position of the curved flow passage to an end angular position. The flow area decreases continuously with a successively reduced value from the initial angular position to an angular position located at least 270° from the initial angular position.

20 Claims, 4 Drawing Sheets

(51) Int. Cl.
*F01D 17/00* (2006.01)
*F01D 25/24* (2006.01)
*F02C 6/12* (2006.01)

(56) References Cited

U.S. PATENT DOCUMENTS

| | | | |
|---|---|---|---|
| 5,624,229 | A | 4/1997 | Kotzur et al. |
| 6,273,679 | B1 | 8/2001 | Na |
| 7,269,950 | B2 * | 9/2007 | Pedersen ............... F01D 17/145 60/602 |
| 9,181,855 | B2 * | 11/2015 | Svihla ................... F02C 6/12 |
| 2003/0053910 | A1 * | 3/2003 | Hosny .................. F02B 37/025 415/205 |
| 2004/0253092 | A1 | 12/2004 | Hancock |
| 2010/0229551 | A1 | 9/2010 | Wu et al. |
| 2010/0266390 | A1 * | 10/2010 | Henderson ............. F01D 9/026 415/151 |
| 2011/0067397 | A1 | 3/2011 | Hirth et al. |
| 2011/0243721 | A1 * | 10/2011 | Alajbegovic ......... F01D 17/167 415/204 |
| 2013/0219885 | A1 | 8/2013 | Watson et al. |
| 2014/0003910 | A1 | 1/2014 | Brinkert et al. |
| 2014/0208741 | A1 * | 7/2014 | Svihla ..................... F02C 6/12 60/605.1 |

FOREIGN PATENT DOCUMENTS

| | | |
|---|---|---|
| DE | 102012016984 A1 | 3/2014 |
| JP | 2009221919 A | 10/2009 |
| JP | 2011231779 A | 11/2011 |
| JP | 2015124743 A | 7/2015 |
| WO | 2015092373 A1 | 6/2015 |
| WO | 2015099199 A1 | 7/2015 |

OTHER PUBLICATIONS

Written Opinion of the International Searching Authority for PCT/SE2017/050243 dated May 18, 2017.
Yang M. et al. "Influence of volute cross-sectional shape of a nozzleless turbocharger turbine under pulsating flow conditions" 2014 Proc. ASME Turbo Expo 2014; Turbine Technical Conference and Exposition, pp. 1-12; Abstract; bottom paragraph on the right on p. 1; bottom paragraph on the left, second and bottom paragraphs on p. 2; figure 2c; "Condusions" on pp. 9-10.
Scania CV AB, International Application No. PCT/SE2017/050243, International Preliminary Report on Patentability, dated Oct. 9, 2018.
Scania CV AB, European Application No. 17779431.0, Extended European Search Report, dated Oct. 15, 2019.

* cited by examiner

TURBINE ARRANGEMENT COMPRISING A VOLUTE WITH CONTINUOUSLY DECREASING FLOW AREA HAVING A SUCCESSIVELY REDUCED VALUE

CROSS-REFERENCE TO RELATED APPLICATIONS

This application is a national stage application (filed under 35 § U.S.C. 371) of PCT/SE2017/050243, filed Mar. 14, 2017 of the same title, which, in turn, claims priority to Swedish Application No. 1650477-1, filed Apr. 8, 2016; the contents of each of which are hereby incorporated by reference.

FIELD OF THE INVENTION

The present invention relates to a turbine arrangement driven by exhaust gases from a combustion engine.

BACKGROUND OF THE INVENTION

A turbine arrangement may comprise a turbine wheel arranged in a turbine housing designed with a volute receiving exhaust gases from a combustion engine. The volute comprises a curved flow passage distributing exhaust gases to the turbine wheel via an inner radial passage extending nearly 360° around the turbine wheel. In a conventional turbine arrangement, the curved flow passage has a cross section area which decreases linearly in the flow direction of the exhaust gases around the turbine wheel. A conventional turbine arrangement can also have a volute with a linearly decreasing Area/Radius ratio where the radius is defined as the radius to a position in the volute. During steady flow conditions, such a curved flow passage provides a uniform distribution of the exhaust gases around the periphery of the turbine wheel and an optimum turbine efficiency.

The exhaust gases from a combustion engine are led to the turbine of a turbo charger via an exhaust gas manifold. In case the volume of the exhaust manifold is small enough in relation to the cylinder volume of the combustion engines, the opening of an exhaust valve will result in pressure pulses with high amplitude which reach the turbine wheel via the exhaust gas manifold. Such pressure pulses contain the majority of the energy available for the turbine wheel. This pulse is called "blow down pulse" and contain the majority of the residual gas energy left from the combustion and therefore very important to convert into mechanical power in the turbine as efficiently as possible to gain over all efficiency of the combustion engine WO 2015/099199 shows a turbine arrangement provided with a scroll section forming a flow passage extending substantially 360° around a turbine wheel. At least a first quarter of the flow passage having a greater reduction of the cross sectional area than a conventional flow passage in which the cross sectional area decreases linearly area vise or Area/Radius vise. In a second half of the flow passage, the cross section area decreases linearly.

SUMMARY OF THE INVENTION

The object of the present invention is to design a flow passage directing exhaust gases to a turbine wheel such that the turbine wheel provides a substantially optimum efficiency when it receives pulsating exhaust gases.

This object is achieved by the turbine arrangement of the initially mentioned kind which is characterized by the features defined in the characterizing part of claim 1. The cross section area of the curved flow passage decreases continuously in the flow direction of the exhaust gases from an initial angular position to an end angular position located about 360° from the initial angular position. A graph can illustrate the cross sectional area as a function of the angular position of the curved flow passage. Furthermore, the flow area decreases continuously but with a successively reduced value from the initial angular position to an angular position located at least 270° from the initial angular position. This means that said graph obtains a continuously concave shape between said angular positions. Tests have been carried out verifying that it is possible to provide an optimum turbine efficiency with such a design of the curved flow passage when pulsating exhaust gases are directed to the turbine wheel.

According to an embodiment of the invention, the flow area decreases continuously with a successively reduced value from the initial angular position to the end angular position. In this case, the cross section area decreases continuously with a successively reduced value in the entire curved flow passage. This means that said graph obtains a continuously concave shape between the initial angular positions and the end angular position.

According to an embodiment of the invention, the curved flow passage comprises a cross sectional area corresponding to three quarters of the initial area at an angular position in the range of 30°-55° from the initial angular position. A conventional curved flow passage comprises a cross sectional area corresponding to three quarters of the initial area at an angular position of 90° from the initial angular position. In case the turbine receives exhaust gases in the form of pressure pulses with moderate amplitude, it is suitable to design the curved flow passage such that it has a cross sectional area corresponding to three quarters of the initial area at an angular position of about 55° from the initial angular position. In case the turbine receives exhaust gases in the form of pulses with very high amplitude, it is suitable to design the curved flow passage such that it has a cross sectional area corresponding to three quarters of the initial area at an angular position of about 30° from the initial angular position. Thus, it is suitable to design the curved flow path depending on the intensity of the pressure pulses directed to the turbine.

According to an embodiment of the invention, the curved flow passage comprises a cross sectional area corresponding to half of the initial area at an angular position in the range of 70°-130° from the initial angular position. A conventional curved flow comprises a cross sectional area corresponding to half of the initial area at an angular position of 180° from the initial angular position. In case the turbine receives exhaust gases in the form of pressure pulses with moderate amplitude, it is suitable to design the curved flow passage such that it has a cross sectional area corresponding to half of the initial area at an angular position of about 130° from the initial angular position. In case the turbine receives exhaust gases in the form of pulses with very high amplitude, it is suitable to design the curved flow passage such that it has a cross sectional area corresponding to half of the initial area at an angular position of about 70° from the initial angular position.

According to an embodiment of the invention, the curved flow passage comprises a cross sectional area corresponding to a quarter of the initial area at an angular position in the range of 130°-220° from the initial angular position. A conventional curved flow passage comprises a cross sectional area corresponding to a quarter of the initial area at an angular position of 270° from the initial angular position. In case the turbine receives exhaust gases in the form of pressure pulses with moderate amplitude, it is suitable to design the curved flow passage such that it has a cross sectional area corresponding to a quarter of the initial area at an angular position of about 220° from the initial angular position. In case the turbine receives exhaust gases in the form of pressure pulses with very high amplitude, it is suitable to design the curved flow passage such that it has a cross sectional area corresponding to a quarter of the initial area at an angular position of about 130° from the initial angular position.

According to an embodiment of the invention, the cross section area of the curved flow passage 16 in within a range of 40%-60% of an initial cross section area at an angular position located 90° from the initial angular position. The cross section area of a conventional curved flow passage is 75% of an initial cross section area at an angular position located 90° from the initial angular position. In case the turbine receives exhaust gases in the form of pressure pulses with moderate amplitude, it is suitable to design the curved flow passage such that the cross section area is about 60% of the initial cross section area at an angular position located 90° from the initial angular position. In case the turbine receives exhaust gases in the form of pressure pulses with very high amplitude, it is suitable to design the curved flow passage such that the cross section area is about 40% of the initial cross section area at an angular position located 90° from the initial angular position.

According to an embodiment of the invention, the cross section area of the curved flow passage 16 in within a range of 12%-33% of an initial cross section area at an angular position located 180° from the initial angular position. The cross section area of a conventional curved flow passage is 50% of an initial cross section area at an angular position located 180° from the initial angular position. In case the turbine receives exhaust gases in the form of pressure pulses with moderate amplitude, it is suitable to design the curved flow passage such that the cross section area is about 33% of the initial cross section area at an angular position located 180° from the initial angular position. In case the turbine receives exhaust gases in the form of pressure pulses with very high amplitude, it is suitable to design the curved flow passage such that the cross section area is about 12% of the initial cross section area at an angular position located 180° from the initial angular position.

According to an embodiment of the invention, the cross section area of the curved flow passage 16 in within a range of 3%-14% of an initial cross section area at an angular position located 270° from the initial angular position. The cross section area of a conventional curved flow passage is 25% of an initial cross section area at an angular position located 270° from the initial angular position. In case the turbine receives exhaust gases in the form of pressure pulses with moderate amplitude, it is suitable to design the curved flow passage such that the cross section area is about 14% of the initial cross section area at an angular position located 270° from the initial angular position. In case the turbine receives exhaust gases in the form of pressure pulses with very high amplitude, it is suitable to design the curved flow passage such that the cross section area is about 3% of the initial cross section area at an angular position located 270° from the initial angular position.

According to an embodiment of the invention, the turbine arrangement comprises two curved flow passages arranged side by side delivering exhaust gases to the turbine from a respective divided exhaust manifold. Thus, the turbine arrangement may comprise a twin scroll turbine provided with two inlet for the exhaust gases. In this case, exhaust gases are alternatively delivered from the respective curved flow passages, via the inner radial passage, to the turbine wheel.

According to an embodiment of the invention, the turbine wheel is configured to receive exhaust gases from a number of cylinders of the combustion engine via an exhaust gas passage having a volume, wherein the ratio between the volume of said exhaust gas passage and the volume of one of the cylinders is smaller than 3. Pressure pulses from the exhaust gases leaving a cylinders will be more or less damped in the exhaust gas passage before they enter the turbine wheel. In case the exhaust gas passage has a large volume, the amplitude of the pressure pulses entering the turbine wheel will be low. In this case, the ratio between the volume of said exhaust gas passage and the volume of one of the cylinders is larger than 3. In this case, the turbine arrangement according to the invention will substantially not obtain a higher efficiency than a conventional turbine arrangement. In case this ratio is between 1 and 3, pressure pulses with moderate amplitude will enter the turbine wheel. In case the ratio is smaller than 1, pressure pulses with high amplitude will enter the turbine wheel. In the two latter cases, the turbine arrangement according to the invention will obtain a significantly higher efficiency than a conventional turbine arrangement.

According to an embodiment of the invention, the curved flow passage is defined by stationary walls. In this case, no movable walls has to be used.

BRIEF DESCRIPTION OF THE DRAWINGS

In the following a preferred embodiments of the invention is described, as an example, with reference to the attached drawings, in which.

DETAILED DESCRIPTION OF A PREFERRED EMBODIMENT OF THE INVENTION

Figure 1:
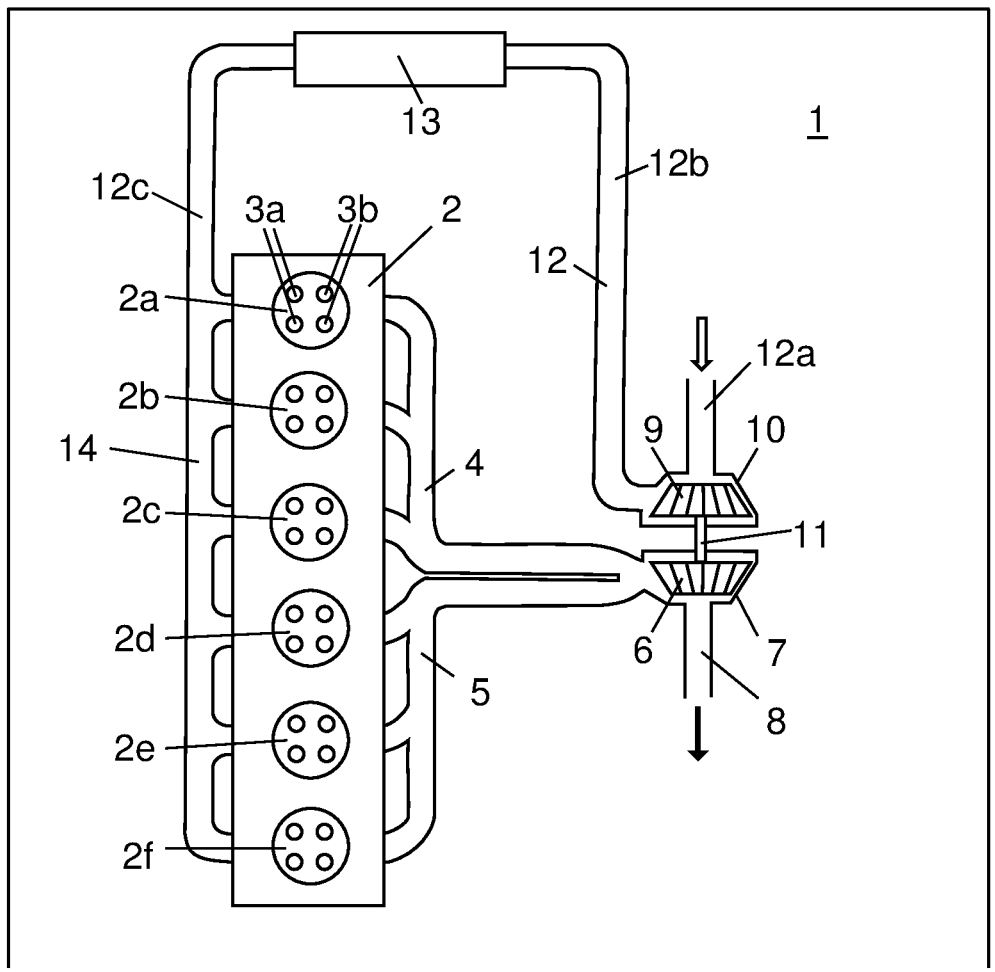
FIG. 1 shows a turbocharger including a turbine arrangement according to the present invention.

FIG. 1 shows a combustion engine 2 powering a schematically indicated vehicle 1. The vehicle 1 may be a heavy vehicle and the combustion engine 2 may be a diesel engine. In this case, the combustion engine 2 is provided with six cylinders 2a-f. Each cylinder 2a-f comprises two inlet valves 3a which in an open state deliver charged air to the cylinders 2a-f and two exhaust valves 3b which in an open state deliver exhaust gases from the cylinders 2a-f to a first exhaust manifold 4 and a second exhaust manifold 5. The first exhaust manifold 4 receives exhaust gases from the cylinders 2a-c and the second exhaust manifold 5 receives exhaust gases from the cylinders 2d-f. The exhaust gases is led, via the respective exhaust manifolds 4, 5 to a turbine of a turbocharger. The turbine comprises a turbine wheel 6 rotatably arranged in a turbine housing 7. The exhaust manifolds 4, 5 and connected parts form an exhaust passage between the cylinders 2a-f and the turbine wheel 6. The turbine is designed as a twin scroll and provided with double inlet for the exhaust gases. The exhaust gases leaves the turbine housing 7 via an exhaust conduit 8.

The turbocharger comprises further a compressor wheel 9 rotatably arranged in a compressor housing 10. The compressor wheel 9 is driven by the turbine wheel 6 via a shaft 11. The compressor wheel 9 is with the compressor housing 10 arranged in a charge air line 12 directing charge air to the combustion engine 2. During operation of the compressor wheel 9, air is drawn from the surrounding, via a first part 12a of the charge air line, to the compressor wheel 9. The air leaves the compressor wheel 9 with an increased pressure and an increased temperature. The charge air line 12 comprises a second part 12b directing the charge air from the compressor wheel 9 to at least one charge air cooler 13. In this case, the charged air cooler is exemplified as an air cooled charge air cooler 13 arranged at a front position of the vehicle 1. The charge air is cooled in the charge air cooler 13 by air of ambient temperature which is forced through the charged air cooler 12 and the radiator 13 by a not shown radiator fan and the ram air of the vehicle 1. The cooled charged air is directed via a third part 12c of the charge air line 12 to an inlet manifold 14 which directs the charge air to the cylinders 2a-f of the combustion engine 2.

Figure 2:
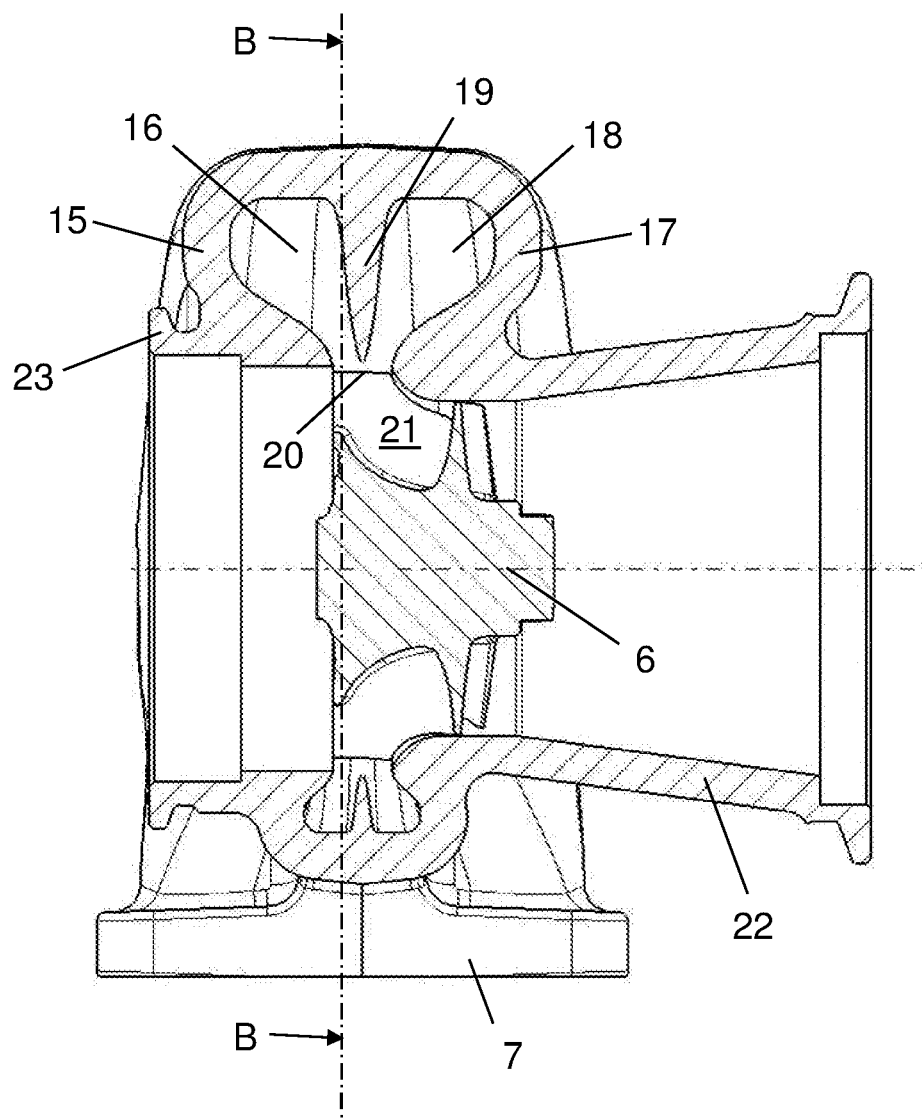
FIG. 2 shows the turbine arrangement more in detail.

FIG. 2 shows a cross section view of the turbine housing 7. The turbine housing 7 comprises a first volute 15 defining a curved flow passage 16 receiving exhaust gases from the first manifold 4 and a second volute 17 defining a curved flow passage 18 receiving exhaust gases from the second exhaust manifold 5. The curved flow passages 16, 18 are arranged in parallel and they usually have a corresponding shape except that they are mirrored. The curved flow passages 16, 18 are divided by a radial wall 19. The exhaust gases leaves the curved flow passages 16, 18 via an inner radial passage 20. The inner radial passage 20 extends nearly 360° around the periphery of the turbine wheel 6. The exhaust gases enter, via the inner radial passage 20, a swept area 21 of the turbine wheel 6 whereupon they expand through the turbine wheel 6. As a result, the turbine wheel 6 obtains a rotary movement which is transferred, via the shaft 11, to the compressor wheel 9. The exhaust gases leave the turbine housing 7, via an outlet portion 22 connected to the exhaust line 8. The turbine house 7 comprises further a connection portion 23 to be connected to the compressor housing 10. The turbine housing 7 and the compressor housing 10 for a housing of the turbocharger enclosing, for example, the shaft 11 connecting the turbine wheel 6 and the compressor wheel 9.

Figure 3:
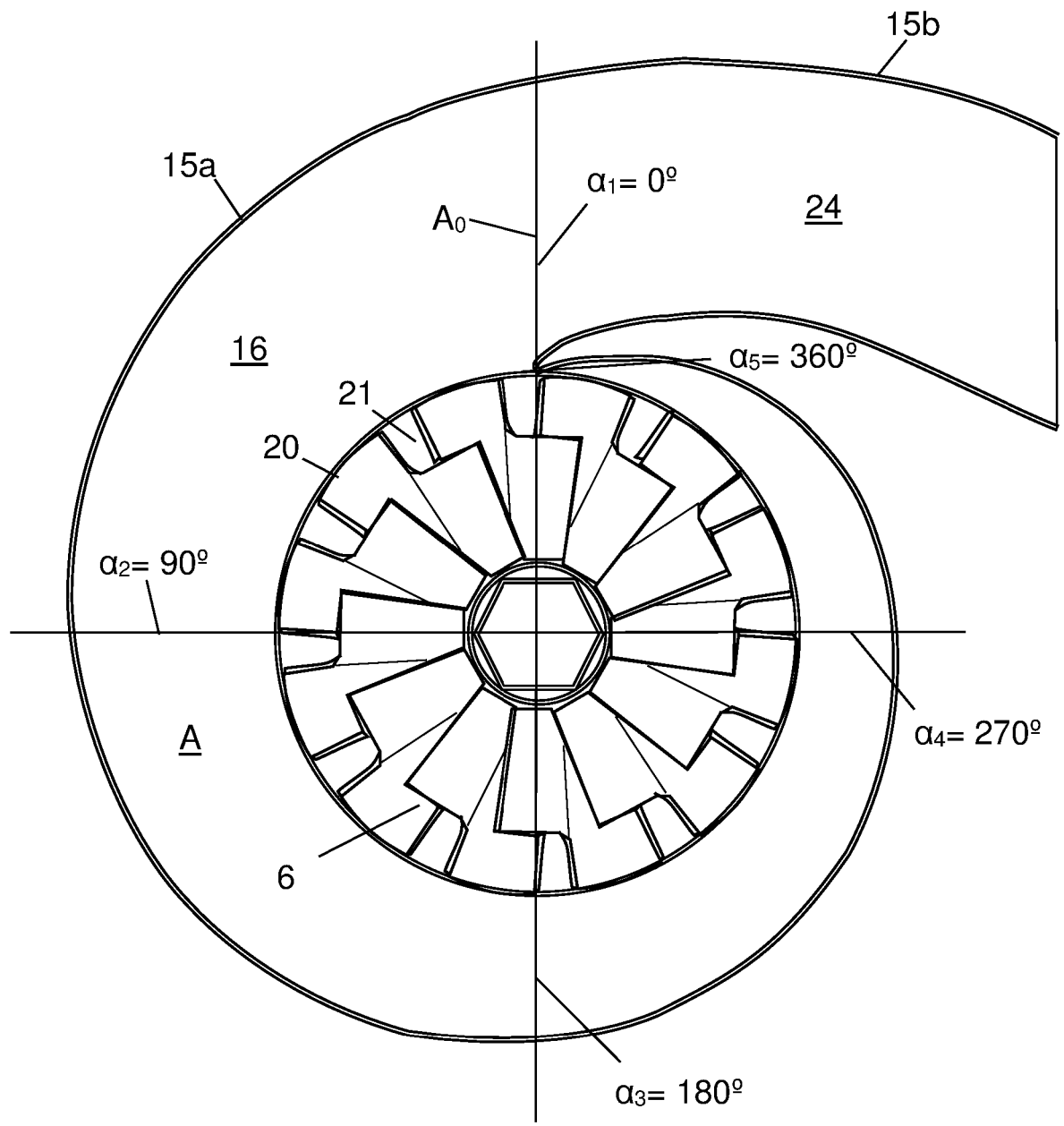
FIG. 3 shows a cross sectional view along the plane B-B in FIG. 2.

FIG. 3 shows a sectional view of the first volute 15. The first volute 15 comprises a curved volute section 15a forming the curved flow passage 16 and an initial volute section 15b forming an initial flow passage 24. The initial flow passage 24 may have a constant cross section area or a somewhat decreasing cross section area in the flow direction. The curved flow passage 16 extends substantially 360° around the periphery of the turbine wheel 6. A first initial angular position $\alpha_1$ of the curved flow passage 16 is indicated. In this angular position $\alpha_1$ the cross section area A of the curved flow passage is $A_0$. A second angular position $\alpha_2$ of the curved flow passage 16 is located at an angular distance of 90° from the initial angular position $\alpha_1$. An third angular position $\alpha_3$ of the curved flow passage 16 is located at an angular distance of 180° from the initial angular position $\alpha_1$. An fourth angular position $\alpha_4$ of the curved flow passage 16 is located at an angular distance of 270° from the initial angular position $\alpha_1$. An fifth angular position $\alpha_5$ of the curved flow passage 16 is located at an angular distance of 360° from the initial angular position $\alpha_1$. The curved flow passage 16 has a continuously decreasing cross section area A in its flow direction from the initial angular position $\alpha_1$, where the cross section area $A=A_0$, to the fifth angular position $\alpha_5$ where the cross section area $A=0$.

Figure 4:
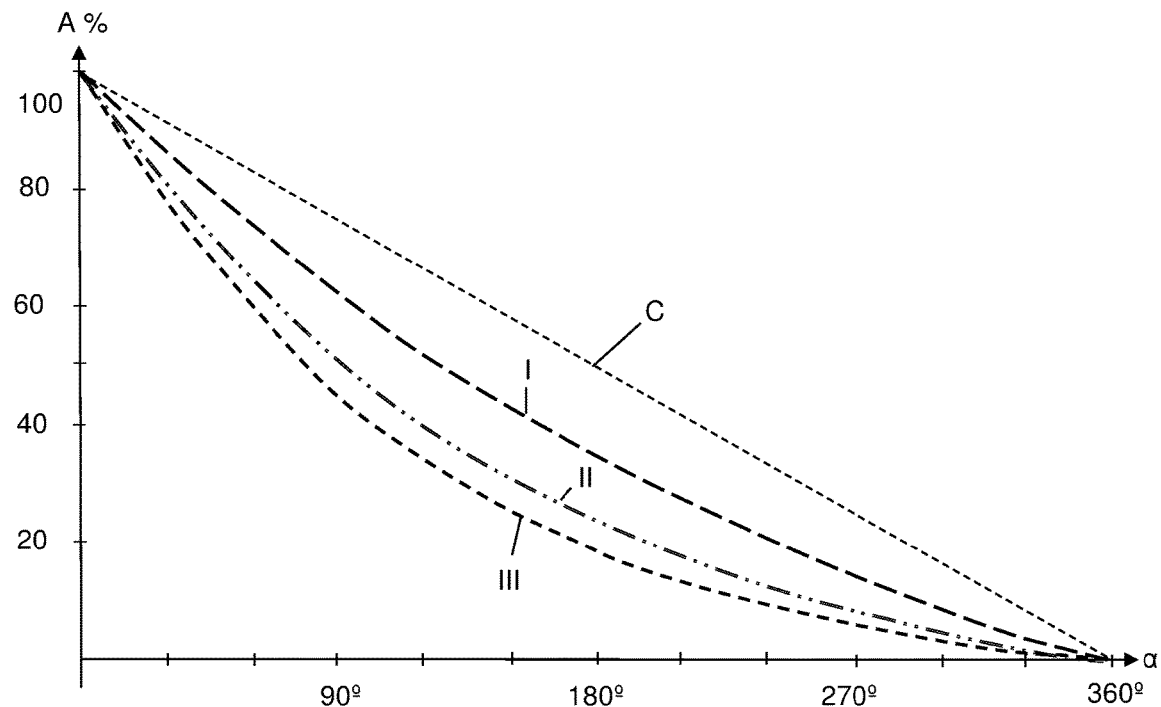
FIG. 4 shows graphs defining the cross section area A of the flow passage as a function of the angular position α for three embodiments of the invention and FIG. 5 shows graphs defining the derivative $\Delta A/\Delta \alpha$ as a function of the angular position α for the three embodiments illustrated in FIG. 4.
Figure 5:
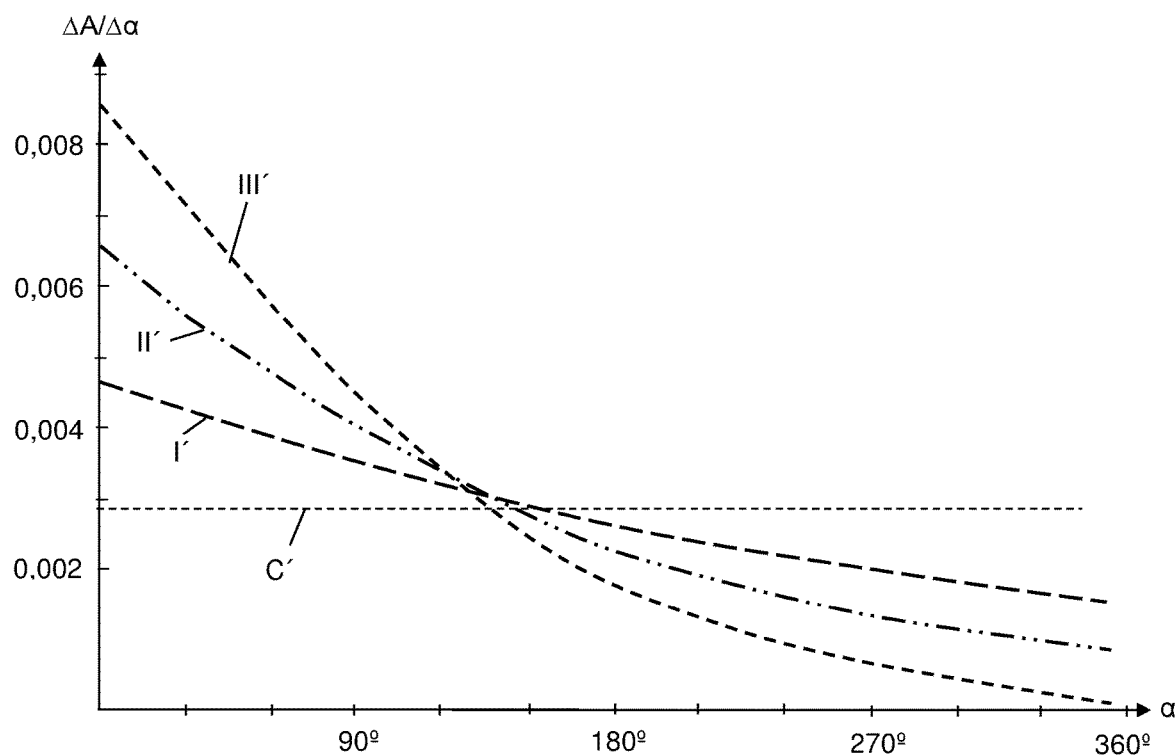

FIG. 4 shows a graph C defining the cross section area A as a function of the angular position $\alpha$ for a conventional curved flow passage 16. In this case, the cross section area A of the curved flow passage 16 decreases linearly with the angular position $\alpha$. FIG. 5 shows a graph C' defining the derivative $\Delta A/\Delta \alpha$ of the cross section area A for the same flow passage 16 with respect to the angular position $\alpha$. Since the cross section area A of the curved flow passage 16 decreases linearly with the circumference position $\alpha$, the derivative $\Delta A/\Delta \alpha$ is constant in all angular position $\alpha$. During steady flow conditions, a curved flow passage 16 with such a decreasing cross section area A provides a uniform distribution of the exhaust gases around the periphery of the turbine wheel and an optimized turbine efficiency.

A pressure pulse of the exhaust gases leaving an exhaust valve 3b of a cylinder 2a-f is transmitted to the turbine wheel 6 via an exhaust gas passage. In this case, the exhaust gas passage is defined by the inlet manifolds 4, 5 and connected exhaust parts upstream of the turbine wheel 6. The pressure pulse is more or less damped depending on the volume of the exhaust gas passage. In case the ratio between the volume of the exhaust gas passage and the volume of the cylinder 2a-f is larger than 3, the pressure pulse will be almost completely eliminated before it enters the turbine wheel 6. In case this ratio is between 1 and 3, pressure pulses with a moderate amplitude will enter the turbine wheel 6. In case this ratio is lower than 1, pressure pulses with a high amplitude will enter the turbine wheel 6. In case moderate or high pressure pulses entering the turbine wheel 6, the turbine efficiency will not be optimal with a conventional design of the curved flow passage 16.

FIG. 4 shows a graph I defining the cross section area A as a function of the angular position $\alpha$ of a curved flow passage 16 according to a first embodiment of the invention. In this case, the turbine efficiency will be substantially optimal when pressure pulses of a moderate amplitude is directed to the turbine 6. The graph I has a continuously concave shape and it slopes downwardly from the first initial angular position $\alpha_1=0°$ to the fifth end angular position $\alpha_5=360°$. FIG. 5 shows a graph I' defining the derivative of the graph I. Thus, the graph I' shows the derivative $\Delta A/\Delta \alpha$ of the cross section area A as a function of the angular position $\alpha$ of the curved flow passage 16. It is to be noted that the graph I' slopes continuously downwardly but with a successively reduced value. Thus, the greatest reduction of the cross section area A is obtained in an initial part of the curved flow passage 16 close to the angular position $\alpha=0°$. The smallest reduction of the cross section area A is obtained in an end part of the curved flow passage close to the angular position $\alpha=360°$. Consequently, the flow area A of the curved flow passage 16 decreases continuously with a successively reduced value from the first initial angular position $\alpha_1$ to the fifth end angular position as.

FIG. 4 shows a graph II defining the cross section area A as a function of the angular position $\alpha$ for a curved flow passage 16 according to a second embodiment of the invention. In this case, the turbine efficiency will be substantially optimal when pressure pulses of a high amplitude is directed to the turbine 6. The graph II slopes continuously downwardly from the first initiate angular position $\alpha_1=0°$ to the fifth end angular position $\alpha_5=360°$. The graph II has a more concave shape than the graph I. FIG. 5 shows a graph II' defining the derivative of the graph II. Thus, the graph II' shows the derivative $\Delta A/\Delta\alpha$ of the cross section area A as a function of the angular position $\alpha$ of the curved flow passage 16 of the second embodiment. It is to be noted that the graph II' slopes continuously downwardly with a successively reduced value. The cross section area A of the curved flow passage 16 according to the second embodiment obtains a greater reduction in an initial part of the curved flow passage 16 close to the angular position $\alpha=0°$ than the cross section area A of the curved flow passage 16 according to the first embodiment.

FIG. 4 shows a graph III defining the cross section area A as a function of the angular position $\alpha$ for a curved flow passage 16 according to a third embodiment of the invention. In this case, the turbine efficiency will be substantially optimal when pressure pulses of a very high amplitude is directed to the turbine 6. The graph III slopes continuously downwardly from the first initial angular position $\alpha_1=0°$ to the fifth end angular position $\alpha_5=360°$. FIG. 5 shows a graph III' defining the derivative of the graph III. Thus, the graph III' shows the derivative $\Delta A/\Delta\alpha$ of the cross section area A as a function of the angular position $\alpha$ of the curved flow passage 16 of the third embodiment. It is to be noted that the graph III' slopes continuously downwardly with a successively reduced value. The cross section area A of the curved flow passage 16 according to the third embodiment obtains a greater reduction in an initial part of the curved flow passage 16 close to the angular position $\alpha=0°$ than the cross section area A of the curved flow passage 16 according to the second embodiment.

A suitable design of the curved flow passage 16 is defined by the area located between the graph I and the graph III in FIG. 4. FIG. 4 shows that a suitable curved flow passage 16 comprises a cross sectional area A corresponding to three quarters of the initial area $A_0$ at an angular position $\alpha$ in the range of 30°-55° from the initial angular position $\alpha_1$. A suitable curved flow passage 16 comprises a cross sectional area A corresponding to half of the initial area $A_0$ at an angular position $\alpha$ in the range of 70° to 130° from the initial angular position $\alpha_1$. A suitable curved flow passage 16 comprises a cross sectional area A corresponding to a quarter of the initial area $A_0$ at an angular position $\alpha$ in the range of 130°-220° from the initial angular position $\alpha_1$. FIG. 4 shows that a suitable cross section area A of the curved flow passage 16 is within a range of 40%-60% of an initial cross section area $A_0$ at an angular position $\alpha 2$ located 90° from the initial angular position $\alpha_1$. A suitable cross section area A of the curved flow passage 16 is within a range of 12%-33% of an initial cross section area $A_0$ at an angular position $\alpha_3$ located 180° from the initial angular position $\alpha_1$. A suitable cross section area A of the curved flow passage 16 is within a range of 3%-14% of an initial cross section area $A_0$ at an angular position ($\alpha 4$) located 270° from the initial angular position $\alpha_1$.

The invention is in no way limited to the embodiments described with reference to the drawings but may be varied freely within the scopes of the claims.

The invention claimed is:

1. A turbine arrangement driven by exhaust gases from a combustion engine, wherein the turbine arrangement comprises:
    a turbine housing;
    a turbine wheel rotatably arranged in the turbine housing;
    a curved volute section defining a curved flow passage extending approximately 360° around the periphery of the turbine wheel, wherein the curved flow passage has a cross sectional area decreasing continuously in the flow direction of exhaust gases therethrough from an initial cross sectional area at an initial angular position of the curved flow passage to an end angular position, wherein the cross sectional area of the curved flow passage decreases continuously at a non-constant rate, from the initial angular position to at least an angular position located at least 270° from the initial angular position; and
    an inner radial passage directing exhaust gases radially inwardly from the curved flow passage into a swept area of the turbine wheel.

2. A turbine arrangement according to claim 1, wherein the flow area decreases continuously at a non-constant rate, from the initial angular position to the end angular position.

3. A turbine arrangement according to claim 1, wherein the curved flow passage comprises a cross sectional area corresponding to three quarters of the initial cross sectional area of the curved flow passage at an angular position in the range of 30°-55° from the initial angular position.

4. A turbine arrangement according to claim 1, wherein the curved flow passage comprises a cross sectional area corresponding to half of the initial cross sectional area of the curved flow passage at an angular position in the range of 70°-130° from the initial angular position.

5. A turbine arrangement according to claim 1, wherein the curved flow passage comprises a cross sectional area corresponding to a quarter of the initial cross sectional area of the curved flow passage at an angular position in the range of 130°-220° from the initial angular position.

6. A turbine arrangement according to claim 1, wherein the cross sectional area of the curved flow passage is within a range of 40%-60% of the initial cross sectional area of the curved flow passage at an angular position located 90° from the initial angular position.

7. A turbine arrangement according to claim 1, wherein the cross sectional area of the curved flow passage is within a range of 12%-33% of the initial cross sectional area of the curved flow passage at an angular position located 180° from the initial angular position.

8. A turbine arrangement according to claim 1, wherein the cross sectional area of the curved flow passage is within a range of 3%-14% of the initial cross sectional area of the curved flow passage at an angular position located 270° from the initial angular position.

9. A turbine arrangement according to claim 1, wherein the turbine arrangement further comprises a second curved volute section defining a second curved flow passage extending approximately 360° around the periphery of the turbine wheel, wherein the second curved flow passage has a cross sectional area decreasing continuously in the flow direction of exhaust gases therethrough from an initial cross sectional area at an initial angular position of the curved flow passage to an end angular position, wherein the cross sectional area of the second curved flow passage decreases continuously at a non-constant rate, from the initial angular position to at least an angular position located at least 270° from the initial angular position.

10. A turbine arrangement according to claim 1, wherein the turbine wheel is configured to receive exhaust gases from a number of cylinders of the combustion engine via an exhaust gas passage upstream of the turbine housing having a specific volume, wherein the ratio between the volume of said exhaust gas passage and the volume of one of the cylinders is smaller than 3.

11. A turbine arrangement according to claim 1, wherein the curved flow passage is defined by stationary walls.

12. A combustion engine arrangement comprising a turbine arrangement driven by exhaust gases from a combustion engine, wherein the turbine arrangement comprises:
- a turbine housing;
- a turbine wheel rotatably arranged in the turbine housing;
- a curved volute section defining a curved flow passage extending approximately 360° around the periphery of the turbine wheel, wherein the curved flow passage has a cross sectional area decreasing continuously in the flow direction of exhaust gases therethrough from an initial cross sectional area at an initial angular position of the curved flow passage to an end angular position, wherein the cross sectional area of the curved flow passage decreases continuously at a non-constant rate, from the initial angular position to at least an angular position located at least 270° from the initial angular position; and
- an inner radial passage directing exhaust gases radially inwardly from the curved flow passage into a swept area of the turbine wheel.

13. A vehicle comprising a turbine arrangement driven by exhaust gases from a combustion engine, wherein the turbine arrangement comprises:
- a turbine housing;
- a turbine wheel rotatably arranged in the turbine housing;
- a curved volute section defining a curved flow passage extending approximately 360° around the periphery of the turbine wheel, wherein the curved flow passage has a cross sectional area decreasing continuously in the flow direction of exhaust gases therethrough from an initial cross sectional area at an initial angular position of the curved flow passage to an end angular position, wherein the cross sectional area of the curved flow passage decreases continuously at a non-constant rate, from the initial angular position to at least an angular position located at least 270° from the initial angular position; and
- an inner radial passage directing exhaust gases radially inwardly from the curved flow passage into a swept area of the turbine wheel.

14. A combustion engine arrangement according to claim 12, wherein the flow area of the curved flow passage decreases continuously at a non-constant rate, from the initial angular position to the end angular position.

15. A combustion engine arrangement according to claim 12, wherein the curved flow passage comprises a cross sectional area corresponding to three quarters of the initial cross sectional area of the curved flow passage at an angular position in the range of 30°-55° from the initial angular position.

16. A combustion engine arrangement according to claim 12, wherein the curved flow passage comprises a cross sectional area corresponding to half of the initial cross sectional area of the curved flow passage at an angular position in the range of 70°-130° from the initial angular position.

17. A combustion engine arrangement according to claim 12, wherein the curved flow passage comprises a cross sectional area corresponding to a quarter of the initial cross sectional area of the curved flow passage at an angular position in the range of 130°-220° from the initial angular position.

18. A vehicle according to claim 13, wherein the flow area of the curved flow passage of the turbine arrangement decreases continuously at a non-constant rate, from the initial angular position to the end angular position.

19. A vehicle according to claim 13, wherein the curved flow passage of the turbine arrangement comprises a cross sectional area corresponding to three quarters of the initial cross sectional area of the curved flow passage at an angular position in the range of 30°-55° from the initial angular position.

20. A vehicle according to claim 13, wherein the curved flow passage of the turbine arrangement comprises a cross sectional area corresponding to half of the initial cross sectional area of the curved flow passage at an angular position in the range of 70°-130° from the initial angular position.

* * * * *